(12) United States Patent
Heiliger et al.

(10) Patent No.: US 7,160,956 B2
(45) Date of Patent: Jan. 9, 2007

(54) VULCANIZABLE RUBBER COMPOUNDS AND PROCESS FOR THEIR PRODUCTION

(75) Inventors: Ludger Heiliger, Neustadt (DE); Thomas Früh, Limburgerhof (DE); Michaela Meiers, Speyer (DE)

(73) Assignee: Rhein Chehie Rheinau GmbH, Manheim (DE)

( * ) Notice: Subject to any disclaimer, the term of this patent is extended or adjusted under 35 U.S.C. 154(b) by 349 days.

(21) Appl. No.: 10/411,907

(22) Filed: Apr. 11, 2003

(65) Prior Publication Data
US 2003/0195289 A1 Oct. 16, 2003

(30) Foreign Application Priority Data
Apr. 15, 2002 (DE) ................. 102 16 657

(51) Int. Cl.
*C08C 19/20* (2006.01)
*C08K 3/34* (2006.01)
*C08K 3/04* (2006.01)

(52) U.S. Cl. .................. 525/332.6; 524/492; 524/495; 525/332.9

(58) Field of Classification Search ................. 524/492, 524/493, 495, 496; 525/332.5, 332.6, 332.9, 525/333.1, 333.2
See application file for complete search history.

(56) References Cited

U.S. PATENT DOCUMENTS

| 4,128,438 | A | 12/1978 | Wolff et al. ................. 106/307 |
| 4,866,131 | A | 9/1989 | Fujimaki et al. ............... 525/96 |
| 4,894,420 | A | 1/1990 | Scriver ........................ 525/237 |
| 5,066,721 | A * | 11/1991 | Hamada et al. ............. 525/102 |
| 5,227,425 | A | 7/1993 | Rauline ....................... 524/493 |
| 5,409,969 | A | 4/1995 | Hamada ..................... 523/213 |
| 5,496,883 | A | 3/1996 | Hamada ..................... 524/492 |
| 5,821,290 | A * | 10/1998 | Labauze ...................... 524/188 |
| 6,017,985 | A * | 1/2000 | Kang et al. .................. 524/263 |
| 6,136,987 | A | 10/2000 | Früh et al. .................. 549/475 |
| 6,797,780 | B1 * | 9/2004 | Obrecht et al. ............. 525/194 |
| 2002/0169248 | A1 | 11/2002 | Esch et al. .................. 524/492 |

FOREIGN PATENT DOCUMENTS

| CA | 2186060 | 3/1997 |
| CA | 2317296 | 3/2001 |
| DE | 199 06 986 | 7/2000 |
| DE | 199 22 639 | 11/2000 |
| DE | 199 47 395 | 4/2001 |
| EP | 0 708 137 | 4/1996 |

OTHER PUBLICATIONS

International Rubber Chemical & Compounding Conference, 22nd, Nov. 23, 1999, Antwerp, Belgium, H.-D. Luginsland, "Processing of the Organo Silane Si 69".

* cited by examiner

*Primary Examiner*—Tae H. Yoon
(74) *Attorney, Agent, or Firm*—Jennifer R. Seng

(57) ABSTRACT

The present invention relates to sulfur-vulcanizable silica-containing rubber compounds with improved processability and a process for their production.

13 Claims, 1 Drawing Sheet

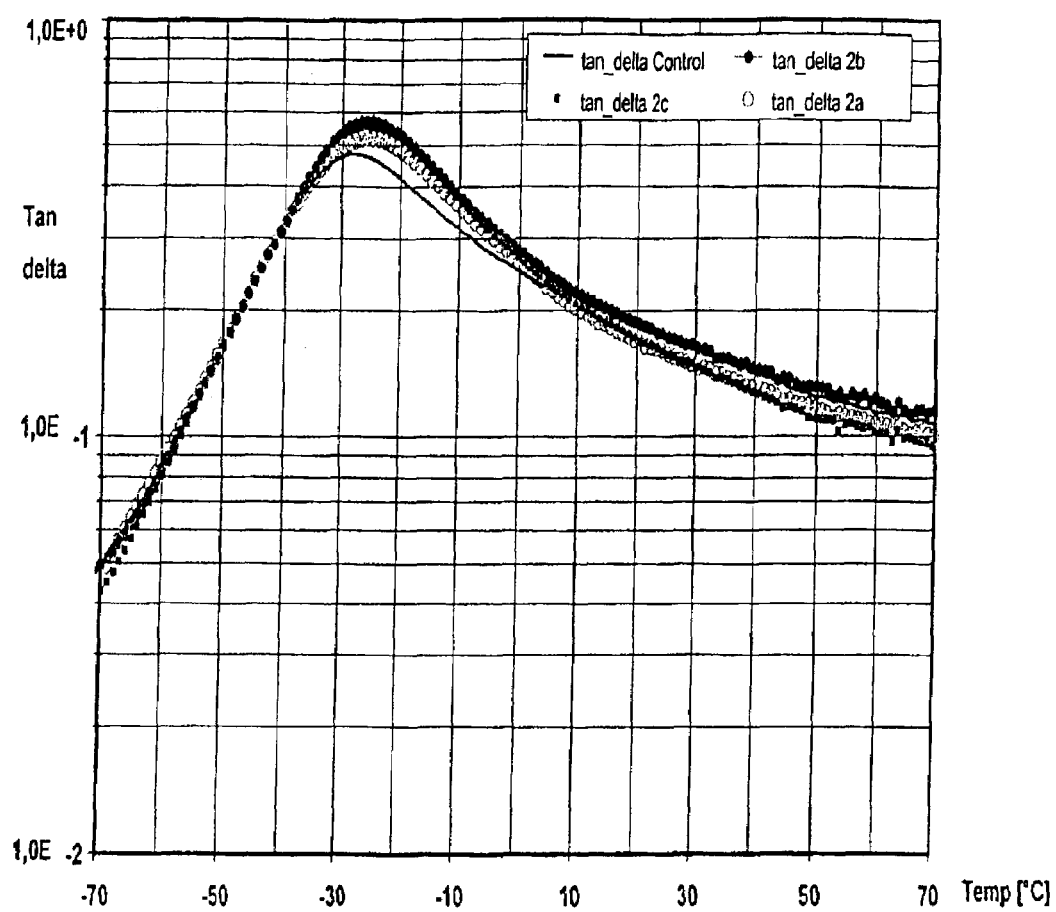

VULCANIZABLE RUBBER COMPOUNDS AND PROCESS FOR THEIR PRODUCTION

FIELD OF THE INVENTION

The present invention relates to sulfur-vulcanizable silica-containing rubber compounds with improved processability which contain, a silane-containing butadiene oil and/or polyisoprene oil, a sulfur donor with melting point <100° C. and, in addition to the conventional auxiliary substances, 5 to 120 parts of a silica, 0 to 100 parts of a rubber carbon black, relative in each case to 100 parts of the rubber polymers that are also included, such as e.g. styrene-butadiene rubber, butadiene or natural rubber, or blends of these rubber polymers.

The present invention also relates to a process for the production of vulcanizable rubber compounds and to the compounds produced therefrom.

BACKGROUND OF THE INVENTION

With increasing environmental awareness, greater priority is being given to cutting fuel consumption and reducing the output of hazardous substances. For the tire manufacturer this means developing tires that are characterized by very low rolling resistance combined with excellent wet skid resistance and good abrasion resistance.

Suggestions for reducing the rolling resistance of a tire and hence fuel consumption have been made in numerous publications and patents. U.S. Pat. Nos. 4,866,131 and 4,894,420 disclose reducing the carbon black content in the compound and using special carbon blacks. However, none of these suggested solutions led to a satisfactory balance between the goal of low rolling resistance and the likewise important tire properties such as wet skid resistance and abrasion resistance.

Only the use of highly active silica fillers in combination with a widespread exchange of the carbon black in the rubber compound appears to offer a route that allows production of a tire with markedly reduced rolling resistance as compared with standard tires combined with retention or even improvement of the two other tire properties mentioned above.

A further improvement in this system with regard to all three properties came with the use of special styrene-butadiene polymers, produced by the solution polymerization method disclosed in EP 0 447 066 A1, in some cases blended with other polymers, in particular polybutadiene, and additional use of novel silica types as disclosed in U.S. Pat. No. 5,227,425 and polymer blends specially tailored for this use as disclosed in EP 0 620 250 A1, with in some cases three to four different starting polymers.

Common to all of these publications and patents is the fact that a large part or the entire content of the carbon black filler that is normally used is replaced by a highly active silica in order to obtain a low rolling resistance while retaining or even improving wet skid resistance and abrasion resistance. In all cases a sulfur-containing organosilane was used as a coupler between the silica and polymer in order to obtain the tire properties that are demanded today.

A typical representative of this class of compound is bis(triethoxysilyl propyl) tetrasulfane (TESPT).

Although the use of bis(triethoxysilyl propyl) tetrasulfane (TESPT) improved important rubber properties such as the dynamic properties that have already been mentioned, this is achieved at the price of a substantially more complicated compounding and processing as compared with carbon black-filled rubber compounds (H.-D. Luginsland "Processing of the Organo Silane Si 69" *The International Rubber Chemicals and Compounding Conference*, 22–23 Nov. 1999, Antwerp, Belgium).

Thus, silica-filled tire tread compounds containing 3,3-bis(triethoxysilyl propyl) tetrasulfide corresponding to the prior art are at extreme risk of scorching and must under no circumstances exceed the temperature limit of 160° C. when being compounded in an internal mixer.

As a result of this, silica-filled tire tread compounds are always mixed, cooled and stored repeatedly, occasionally up to five times, before the unvulcanised mixes can be accelerated and processed further, whereas in the case of carbon black-filled tire tread compounds the compounds can be processed further after being mixed only twice at elevated mixing temperatures. Silica-filled tire compounds thus give rise to an enormous drop in productivity in the tire manufacturer's entire production process.

It is therefore desirable to produce a compound which enables the improved properties of the silica-filled compounds to be achieved yet nevertheless permits mixing temperatures above 160° C. during processing and thus makes it possible to have fewer mixing stages than previously, as a result of which the productivity of the tire manufacturing process is increased, i.e. the overall production costs of the tire manufacturing process with silica compounds are reduced.

It is also desirable to reduce ethanol emissions, which originate from the low-molecular sulfur-containing organosilanes, during production of the silica compounds.

These objects are achieved by silica-containing rubber compounds according to the present invention and the process for their production.

SUMMARY OF THE INVENTION

The present invention therefore provides sulfur-vulcanizable silica-containing rubber compounds with improved processability, containing
a) a silane-containing butadiene oil and/or polyisoprene oil
b) a sulfur donor with melting point <100° C. and in addition to the conventional auxiliary substances
c) 5 to 120 parts of a silica
d) 0 to 100 parts of a rubber carbon black, relative in each case to 100 parts of
e) the rubber polymers that are also included, such as e.g. styrene-butadiene rubber, butadiene or natural rubber, or blends of these rubber polymers.

BRIEF DESCRIPTION OF THE DRAWING

The FIGURE is a graph of the loss angle (tan 6) versus temperature of compounds according to the present invention and a control compound.

DETAILED DESCRIPTION OF THE INVENTION

Precipitated silicas having a BET surface area (ISO 5794/1D) of between 100 and 250 $m^2/g$ are used, preferably if they display a CTAB surface area (ASTM D3765-92) of between 100 and 250 $m^2/g$ and a DBP number between 150 and 300 ml/100 g (ASTM D1208).

The silicas can be added both in powder form and also in bead or granule form. They include both the types that have been known for many years and the latest developments, such as, are described for example in DE-OS 4427137.

According to the present invention, additives such as e.g. inorganic fillers other than the aforementioned silica and silicates can be incorporated into the rubber compound, provided that the quantities used do not detract from the purpose of this present invention.

Other inorganic fillers include carbon blacks such as SRF, GPF, FEF, HAF, ISAF, FT and MT.

The total content of fillers should not exceed 120 parts per 100 parts of polymer.

1 to 25 parts, preferably 5 to 10 parts of a silane-containing butadiene oil, characterized by a silane content of 1% to 10% and a molecular weight ($M_n$) of 1000 to 10000, are used to produce silica-containing compounds according to the present invention.

In addition, petroleum-based plasticizers conventionally used in rubber can be added.

The production of vulcanizates from the rubber compounds according to the present invention requires only the preparation of unvulcanised rubber mixes by the method described below, followed by molding of the unvulcanized mixes according to requirements with subsequent vulcanization in the same way as for conventional rubber compounds.

0.1 to 10 parts of sulfur donors displaying a melting point <100° C., such as e.g. dithiophosphatopolysulfides, sulfured castor oil or sulfur-containing alkanoic acids HOOC—$(C_nH_{2n})$—$S_x$, whereby n=2 to 5 and x=2 to 5, are used as vulcanizing agents to produce the vulcanizates according to the present invention. Dithiophosphatopolysulfides are known and can be produced as described in DE 19 906 986. Sulfur-containing alkanoic acids HOOC—$(C_nH_{2n})$—$S_x$, where n=2 to 5 and x=2 are likewise described and can be produced according to DE 19 942 395. In addition to the sulfur donors, other elemental or insoluble sulfur can also be used.

0.5 to 7 parts of a sulfur donor, characterized in that it displays a melting point <100° C., are preferably used in combination with 0.1 to 5 parts of sulfur relative to 100 parts of the copolymer or mixtures thereof with other diene polymers.

Vulcanization accelerators are preferably additionally used to produce vulcanizates according to present invention. The vulcanization accelerators used include e.g. thiazole compounds, such as e.g. N-cyclohexyl-2-benzothiazole sulfonamide, N,N-diisopropyl-2-benzothiazole sulfonamide, 2-mercaptobenzothiazole and dibenzothiazyl disulfide; guanidine compounds, such as e.g. diphenyl guanidine, triphenyl guanidine, diorthotolyl guanidine; dithiophosphate compounds, such as e.g. zinc dibutyl dithiophosphate, zinc dioctyl dithiophosphate; imidazoline compounds, such as e.g. 2-mercaptoimidazoline; thio urea compounds, such as e.g. diethyl thio urea, trimethyl thio urea and diorthotolyl thio urea; thiuram compounds, such as e.g. tetramethyl thiuram monosulfide, tetramethyl thiuram disulfide, tetraethyl thiuram disulfide, tetrabutyl thiuram disulfide, pentamethylene thiuram tetrasulfide; dithiocarbamate compounds, such as e.g. zinc dimethyl dithiocarbamate, zinc diethyl dithiocarbamate, zinc di-n-butyl dithiocarbamate, zinc ethylphenyl dithiocarbamate, zinc butylphenyl dithiocarbamate, sodium dimethyl dithiocarbamate, selenium dimethyl dithiocarbamate and tellurium dimethyl dithiocarbamate; xanthate compounds, such as e.g. zinc dibutyl xanthate or aryl guanidinium xanthogenates as disclosed in U.S. Pat. No. 6,136,987.

The vulcanization accelerators are used in a quantity of between 1 and 20 parts by weight, preferably between 0.5 and 5 parts by weight, relative to 100 parts by weight of the copolymer or blends thereof with the other polymers.

Other rubber auxiliary substances, such as e.g. additional crosslinking agents such as sulfur for example, antioxidants, heat stabilizers, light stabilizers, anti-ozonants, processing aids, tackifiers, blowing agents, waxes, extenders, organic acids, retarders and metal oxides, can also be used for the production of vulcanizates according to the present invention.

The silane-containing butadiene oil and the silica can be caused to react during incorporation into the claimed rubber compounds.

The entire amount of silica used can optionally also be modified in advance with the silane-containing butadiene oil, either separately or in the same mixing unit. It is also possible to modify only part in advance and to use the rest without prior modification.

If carbon black is intended as an additional filler for the rubber compound to be produced, it is possible in another variant to add the silane-containing butadiene oil either entirely or partly as a carbon black/oil blend. This is then preferably used in the form of granules with a content of 30 to 60 wt. % of silane-containing butadiene oil and 70 to 40 wt. % of carbon black. The production of similar granules is described in U.S. Pat. No. 4,128,438 and can be performed here in a similar way.

The unvulcanized rubber mix is produced by the method described below. The aforementioned rubber components, the silane-containing butadiene oil, the amorphous silica, and the carbon black that is optionally present, optionally together with additives and optionally further additives, are kneaded in a kneader, e.g. a Banbury internal mixer, at a temperature of approx. 120 to 200° C. for 3 to 10 minutes. At the beginning of the kneading process it is advantageous to knead the compound without the silane-containing butadiene oil for up to 1.5 min to improve the dispersive distribution of the silica, before then adding the silane-containing butadiene oil to the compound. This entire kneading process, i.e. the mixing stage, can be repeated several times to improve dispersion of the solid additives, primarily the silica and optionally the carbon black. With the rubber compound according to the present invention one mixing stage in the kneader at temperatures of between 160 and 180° C. is advantageously sufficient. The vulcanizing agents such as accelerators, sulfur and a sulfur donor with melting point <100° C. and optionally another vulcanizing agent or retarder are then added to the unvulcanized mix prepared in this way and mixed for a further 5 to 30 minutes either in a Banbury internal mixer or on a mixing roll at temperatures <120° C. and the finished rubber compound then drawn out as a rubber sheet or in the form of strips.

Rubber tests on the vulcanizates produced from the compounds according to the present invention show that by using silane-containing butadiene oil in combination with sulfur donors having a melting point <100° C. a markedly higher crossover can be achieved as compared with the use of sulfur-containing organosilanes in silica-containing compounds in styrene-butadiene rubbers, which in a tire tread compound corresponds to a higher wet skid resistance combined with lower rolling resistance.

These vulcanizates can be used in the production of moldings and structural components of tires.

EXAMPLES

The following silica-containing formulations were used.

| | Control | Compound 1 according to the invention | Compound 2 according to the invention |
|---|---|---|---|
| Buna VSL 5025-1 | 96.0 | 96.0 | 96.0 |
| Buna CB 24 | 30.0 | 30.0 | 30.0 |
| Ultrasil ® 7000 GR | 70.0 | 70.0 | 70.0 |
| Carbon black N 115 | 5.0 | 5.0 | 5.0 |
| Carbon black N 330 | — | 6.25 | 6.25 |
| Silane X 50 S | 12.5 | — | — |
| Silanized butadiene oil | — | 6.25 | 10.0 |
| Stearic acid | 1.0 | 1.0 | 1.0 |
| Zinc oxide RS | 3.0 | 3.0 | 3.0 |
| Vulkanox ® 4020 | 1.0 | 1.0 | 1.0 |
| Vulkanox ® HS | 1.0 | 1.0 | 1.0 |
| Antilux ® 500 L | 1.5 | 1.5 | 1.5 |
| Plasticizer 450 | 8.0 | 8.0 | 8.0 |
| Rhenogran ® S 80 | 1.9 | 1.9 | 1.9 |
| Rhenogran ® CBS 80 | 1.9 | 1.9 | 1.9 |
| Rhenogran ® DPG 80 | 2.5 | 2.5 | 2.5 |
| Rhenofit ® SASD | — | 2.0 | 2.0 |

Buna VSL 5025-1, Buna CB 24, Vulkanox ® 4020, Vulkanox ® HS commercial products from Bayer AG Leverkusen.
Ultrasil ® 7000 GR and Silane X 50 S commercial products from Degussa.

-continued

| | Control | Compound 1 according to the invention | Compound 2 according to the invention |
|---|---|---|---|

Rhenogran ® S 80, Rhenogran ® CBS 80, Rhenogran ® DPG 80, Rhenofit ® SASD and Antilux ® 500 L commercial products from Rhein Chemie Rheinau GmbH.
Plasticizer 450, highly aromatic plasticizer oil from Fuchs-DEA.

The silanized butadiene oil was prepared as follows:

2.9 g tin di-(2-ethyl) hexanoate (Desmorapid® SO from Rhein Chemie Rheinau GmbH) and 200 g 3-isocyanato-n-propyl triethoxysilane (from Fluka) are added at room temperature to 378.4 g Poly B-D® R 20 LM (hydroxy-terminated polybutadiene from Elf Atochem, molecular weight 1200 g/mol, hydroxyl value: 109 mg KOH/g). After 2 h the NCO content is 0.0%.

Mixing time and temperature during the mixing process for the control compound in a Werner & Pfleiderer GK 1.5 E laboratory internal mixer, fill level 75%, preheated to 100° C.

| Mixing stage | Control Stage 1 | Control Stage 2 | Control Stage 3 | Control Stage 4 |
|---|---|---|---|---|
| $T_{max}$ needle (° C.) | 151 | 151 | 144 | 112 |
| Effective total mixing time (sec) | 220 | 350 | 480 | 550 |
| ML (1 + 4) 100° C. | 144 | 102 | 86 | 69 |

The polymers are added first, then kneaded for 1 min, then ½ the amount of Ultrasil® is added together with the entire amount of X50S, followed by kneading for 1 min, and then the remaining components are added, with the exception of the last 4 constituents in the formulation table. Those are only added to the compound at stage 4. The compound is stored for 24 h at room temperature between the individual stages.

TABLE 2

Compound properties of the compounds according to the present invention

| | Compound 1a | Compound 1b | Compound 1c | Compound 2a | Compound 2b | Compound 2c |
|---|---|---|---|---|---|---|
| Agent | 6 phr silanized butadiene oil | 6 phr silanized butadiene oil | 6 phr silanized butadiene oil | 10 phr silanized butadiene oil | 10 phr silanized butadiene oil | 6 phr silanized butadiene oil |
| Mixing stage | Stage 1 | Stage 1 | Stage 1 | Stage 1 | Stage 1 | Stage 1 |
| Mixing procedure | +130 sec 40 rpm | +260 sec 40 rpm | +130 sec 60 rpm | +130 sec 40 rpm | +260 sec 60 rpm | +260 sec 60 rpm |
| $T_{max}$ needle (° C.) | 162 | 166 | 185 | 162 | 185 | 186 |
| Effective total mixing time (sec) | 350 | 480 | 350 | 350 | 480 | 480 |
| Silane residence time in internal mixer (sec) | 130 | 260 | 130 | 130 | 260 | 260 |
| ML (1 + 4) 100° C. | 135 | 106 | 117 | 94 | 94 | 119 |

As can be seen, the control mixture has to be mixed in 4 stages with temperature control ($T_{max}$<155° C.) in order to arrive at a processable viscosity range, whereas after just one stage compounds according to the present invention correspond to the control compound after 2 to 3 stages, i.e. 1 to 2 mixing stages can be saved with the compounds according to the present invention as compared with the prior art.

It can clearly be seen that the compounds 1b, 2a, 2b and 2c according to the present invention achieve the same level of dynamic properties as the control compound. With a higher content of silanized butadiene oil but a shorter effective mixing time, compound 2a results in end properties that match those of the control compound.

TABLE 3

Loss angle (tan delta) against temperature

| Temp ° C. | 2a tan δ | 2b tan δ | 2c tan δ | Control tan δ |
|---|---|---|---|---|
| −20.0 | 0.4960 | 0.5402 | 0.5269 | 0.4290 |
| −10.0 | 0.3649 | 0.3873 | 0.3801 | 0.3210 |
| 0.0 | 0.2562 | 0.2748 | 0.2624 | 0.2463 |
| 10.0 | 0.2002 | 0.2179 | 0.2046 | 0.2077 |
| 50.0 | 0.1171 | 0.1315 | 0.1104 | 0.1233 |
| 60.0 | 0.1064 | 0.1200 | 0.1014 | 0.1136 |

Shear modulus measurements were taken on vulcanizates as a function of temperature at 1 Hz frequency and 0.5% deformation. The FIGURE and Table 3 show by way of example a comparison between the control compound and compounds 2a, 2b and 2c.

It can be seen that in the low-temperature range (−30 to 0° C.) the vulcanizates according to the present invention yield markedly higher tan δ values than the control compound. According to current thinking this means potentially higher wet skid resistance values in tire tread compounds.

By the same line of argument the tan δ values that can be seen in the FIGURE at temperatures of 50 to 60° C. would suggest a potentially lower rolling resistance. Compounds 2a and 2c display higher tan δ values at low temperatures and lower tan δ values at higher temperatures as compared with the control. This "crossover" is always desirable.

It can be seen that when compounds according to the present invention are used the dynamic properties produce a crossover effect, which should lead to an improved wet skid resistance and a reduced rolling resistance.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A rubber compound with improved processability comprising
    a) at least one rubber polymer,
    b) a silane-containing butadiene oil, a silane containing polyisoprene oil, or a mixture thereof,
    c) a sulfur donor having a melting point <100° C.,
    d) 5 to 120 parts of a silica,
    e) 0 to 100 parts of a rubber carbon black, relative in each case to 100 parts of the rubber polymer,
    wherein component b) has a silane content of 1 to 10% and a molecular weight ($M_n$) of 1,000 to 10,000.

2. The rubber compound according to claim 1, wherein the rubber polymer is selected from the group consisting of styrene butadiene rubber, butadiene rubber, natural rubber and a mixture thereof.

3. The rubber compound according to claim 1, wherein component b) is present in 1 to 25 parts.

4. The rubber compound according to claim 3, wherein component b) is present in about 5 to 10 parts.

5. The rubber compound according to claim 1, wherein component c) is selected from the group consisting of dithiophosphatopolysulfides, phosphoryl polysulfide, sulfured castor oils and sulfur containing alkanoic acids of the formula $HOOC-(C_nH_{2n})-S_x$, wherein n is between 2 and 5, and x is between 2 and 5.

6. The rubber compound according to claim 5, wherein component c) is a phosphoryl polysulfide.

7. The rubber compound according to claim 1, further comprising a vulcanizing agent.

8. The rubber compound according to claim 1, further comprising auxiliary substances, fillers or a mixture thereof.

9. A process for producing rubber compounds according to claim 1, comprising the steps of mixing components a), b), d), optionally e) and optionally a plasticizer at a temperature of 120° C. to 200° C., then admixing component c) and optionally auxiliary substances and fillers at a temperature <120° C.

10. The process according to claim 9, wherein component d) is reacted with component b) before mixing with component a) and optionally component e).

11. A process for producing rubber compounds according to claim 1, comprising the steps of mixing components a), d), and optionally, a) at a temperature of 120° C. to 200° C., then admixing component b) and then admixing component c).

12. A molding comprising a rubber compound comprised of
    a) at least one rubber polymer,
    b) a silane-containing butadiene, a silane containing polyisoprene oil, or a mixture thereof,
    c) a sulfur donor having a melting point <100° C.,
    d) 5 to 120 parts of a silica,
    e) 0 to 100 parts of a rubber carbon black,
    relative in each case to 100 parts of the rubber polymer,
    wherein component b) has a silane content of 1 to 10% and a molecular weight ($M_n$) of 1,000 to 10,000.

13. A molding according to claim 12 in the form of a tire component.

* * * * *